Sept. 13, 1966  J. F. JONES ETAL  3,271,949
GAS TURBINE

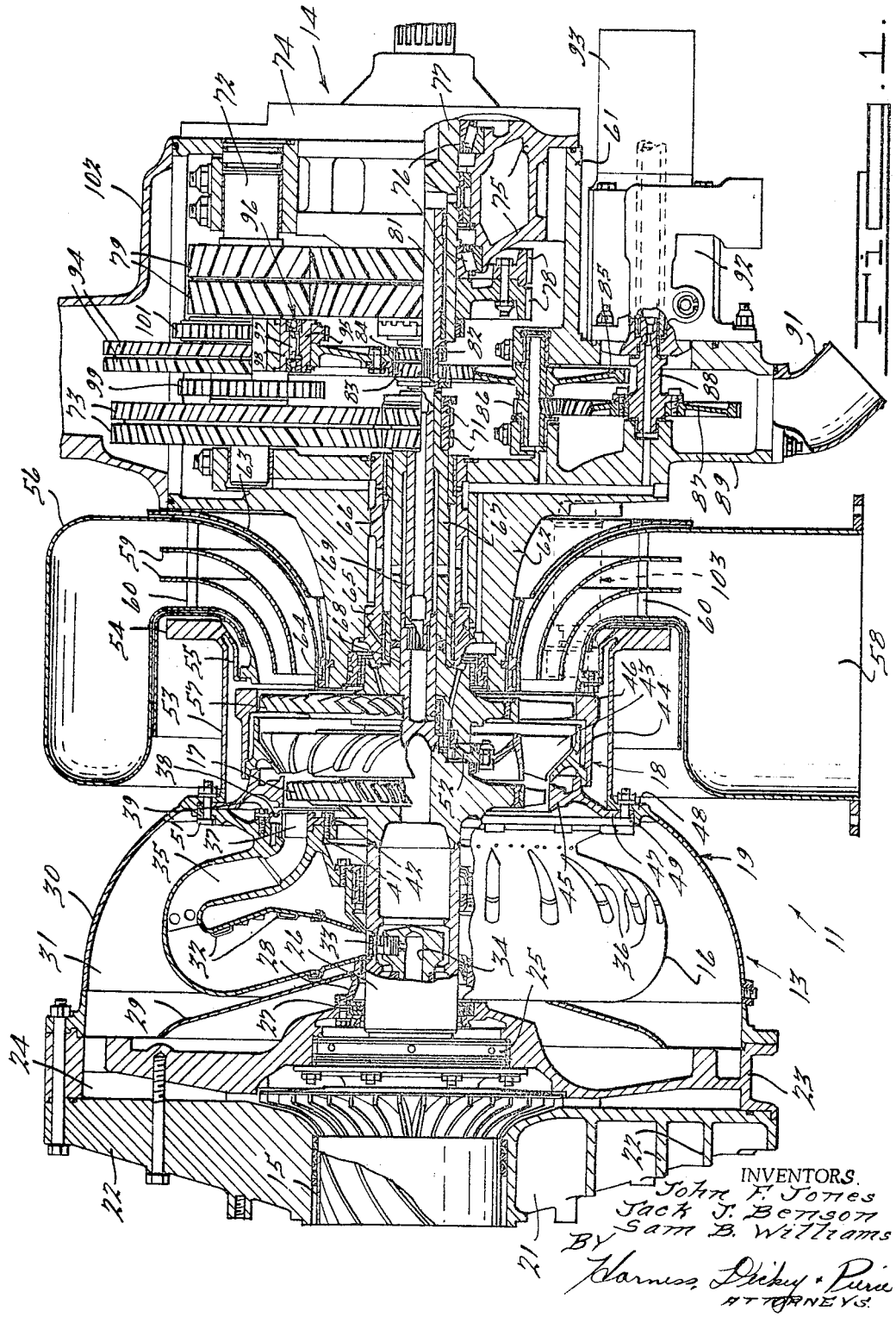

Filed April 26, 1963  4 Sheets-Sheet 2

INVENTORS
John F. Jones
Jack J. Benson
Sam B. Williams
BY
Harness, Dickey & Pierce
ATTORNEYS

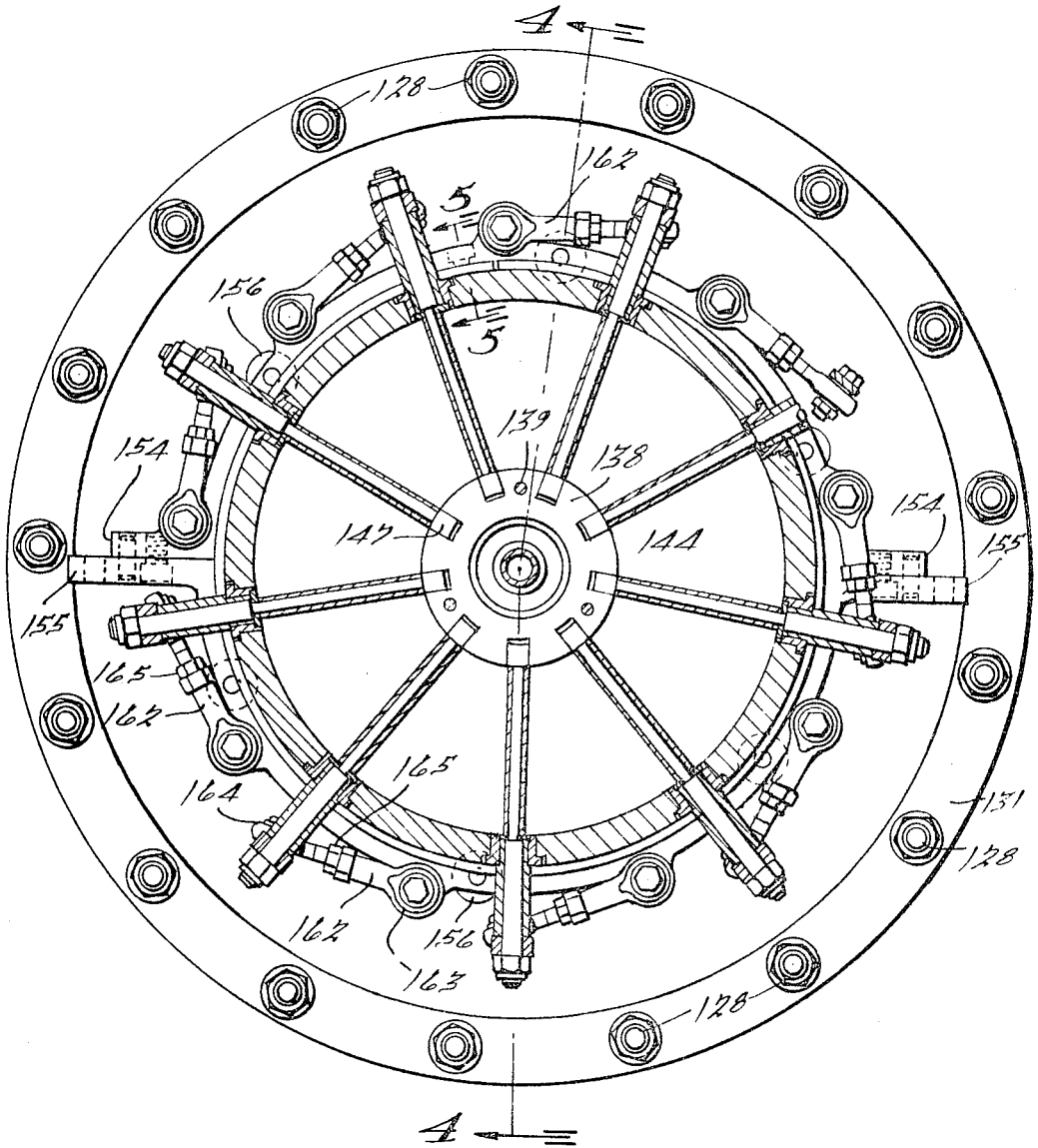

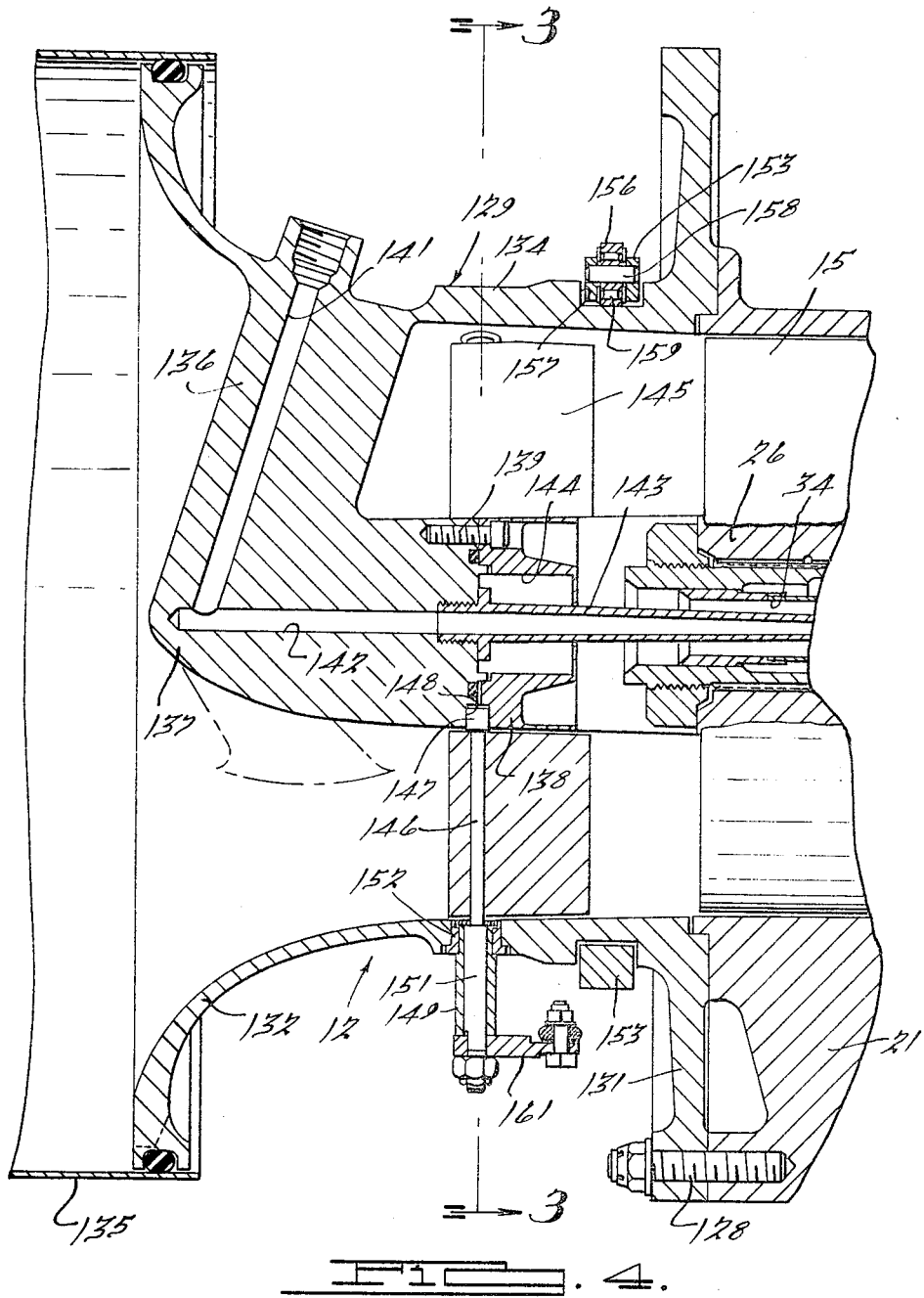

United States Patent Office 3,271,949
Patented Sept. 13, 1966

3,271,949
GAS TURBINE
John F. Jones, Berkley, Jack J. Benson, Detroit, and Sam B. Williams, Walled Lake, Mich., assignors to Williams Research Corporation, Walled Lake, Mich., a corporation of Michigan
Filed Apr. 26, 1963, Ser. No. 275,835
5 Claims. (Cl. 60—39.16)

This invention relates to gas turbines, and more particularly to multiple stage turbines of the type having a centrifugal compressor, and gearing disposed at the forward end of the unit.

It is an object of the invention to provide an improved gas turbine in which the power head, including the compressor, burner, and first stage turbine wheel, is supported in a novel manner which facilitates the maintenance of alignment and permits great flexibility in designing the configuration of the exhaust ductwork.

It is another object to provide an improved gas turbine of this nature in which novel means are provided for controlling the speed of the first turbine stage in response to load variations at the second or power stage, thus preventing excessive first stage speed.

It is a further object to provide an improved gas turbine of this character which eliminates the use of thrust bearings on the second stage shaft by incorporating novel means for maintaining the axial position of this shaft, thus avoiding constructional difficulties which would be involved in providing thrust bearings for the relatively high speed second stage shaft.

It is another object to provide an improved gas turbine of the above nature in which disassembly is facilitated by an integrally formed subassembly including the second stage nozzle vanes and the first and second stage turbine shrouds, this subassembly being secured to the outer turbine housing together with the burner by a single set of bolts.

It is also an object to provide an improved gas turbine of this character which includes a novel variable inlet vane construction in conjunction with the centrifugal compressor.

Other objects, features, and advantages of the present invention will become apparent from the subsequent description, taken in conjunction with the accompanying drawings, in which:

FIGURE 1 is a cross-sectional view of a suitable embodiment of the gas turbine, the section being taken generally in a vertical plane but with portions being shown out of the vertical plane for purposes of the description, the variable vane inlet subassembly being omitted;

FIGURE 4 is a vertical cross-sectional view of the compressor inlet taken along the line 4—4 of FIGURE 3, parts being omitted; and FIGURE 5 is a detailed cross-sectional view taken along the line 5—5 of FIGURE 3 and showing the means for clamping the adjusting ring.

Figure 3:
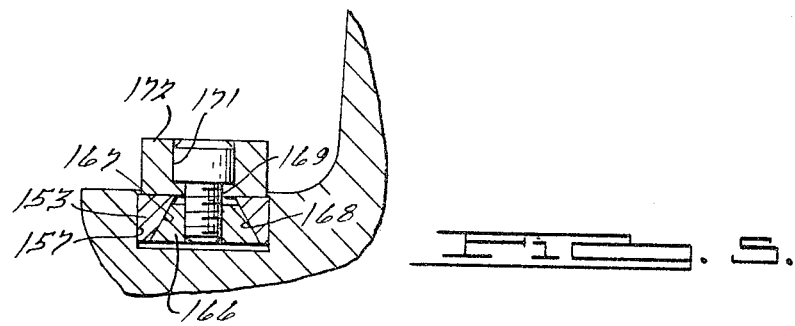
FIGURE 3 is a front elevational view in cross section of the compressor inlet showing the variable vane construction, taken along the line 3—3 of FIGURE 4, parts being sectioned.

Briefly, the illustrated embodiment of the invention comprises a multiple stage gas turbine of the nonregenerative type having a centrifugal compressor and an annular combustion chamber or burner, the first stage turbine wheel having a shaft extending back through the burner to the compressor. The shrouds for the first and second stage turbine wheels are secured integrally to the second stage nozzle assembly, this integral unit being secured together with the burner to the outer power head housing by a single set of circumferentially spaced bolts.

A gear housing is disposed forwardly of the power head housing, and the latter is secured thereto in cantilever fashion by a plurality of circumferentially spaced bolts extending axially through the exhaust collector. Relatively few bolts may be used, these bolts being of substantial size and having heat shields as well as insulative material. Tubes are formed in the exhaust collectors through which the bolts extend, with the annular air spaces between the tubes and bolts being open to the atmosphere, thus providing further insulation.

An output shaft is rotatably mounted at the forward end of the gear housing coaxially with the turbine and supported by thrust bearings. The second stage turbine shaft is not supported by thrust bearings but is connected to the output shaft by an intermediate shaft in offset parallel relation with the output and turbine shafts, herringbone gears being mounted on the shafts to form the connection so that the output shaft in effect retains the second stage turbine shaft against axial movement.

A quill shaft connected to a first stage turbine wheel extends through the second stage shaft and carries accessory drive pinions in herringbone arrangement. A gear mounted on and connected to the intermediate shaft through an overrunning clutch meshes with the accessory shaft pinions. The arrangement is such that with normal loads and speeds, the rotational speed of the intermediate shaft relative to the first stage shaft will be insufficient to cause the overrunning clutch to drive this last-mentioned gear, which may be termed a governor feed-back gear. However, should the load on the output shaft be sufficiently reduced, the increased speed of the intermediate shaft will cause the governor feed-back gear to drive the first stage shaft.

The first stage shaft is connected by gearing to a conventional fuel governor, so that the increased speed imparted to the first stage shaft by the speedup of the intermediate shaft will cause the fuel supply to be decreased. In this manner, the governor will react more quickly to changes in load which might affect the first stage speed than would be the case if the overrunning clutch and feedback gear arrangement were not present.

A variable inlet vane subassembly is provided for the centrifugal compressor. This subassembly includes a stationary hub and outer shroud between which extend a plurality of circumferentially spaced vanes. These vanes are pivotable on radial axes, and are controlled by a circumferentially adjustable ring mounted on the shroud and connected to vane pivot rods by links and crank arms.

Referring more particularly to the drawings, the gas turbine is generally indicated at 11 in FIGURE 1 and comprises an inlet vane subassembly (not seen in FIGURE 1 but indicated generally at 12 in FIGURE 4), a power head subassembly generally indicated at 13 and a gear box subassembly generally indicated at 14. Power head 13 includes a centrifugal compressor 15, an annular combustion chamber or burner 16, a first stage turbine wheel 17, and a second stage nozzle and turbine wheel shroud subassembly generally indicated at 18. These parts are all supported by a power head housing generally indicated at 19.

Housing 19 includes a compressor diffuser cover 21 at the rearward end thereof which extends radially outwardly from compressor 15 and has cooling fins indicated at 22. A compressor diffuser and support 23 is secured to cover 21 on the forward side thereof and forms a diffuser passage 24 which extends radially outwardly and then axially, as seen in the upper portion of FIGURE 1.

Member 23 also supports a bearing 25 for a shaft 26 extending from turbine wheel 17 to compressor 15, as well as an oil seal 27 having a seal retainer 28. A heat shield 29 is mounted on seal retainer 28 and extends outwardly between burner 16 and support 23.

A dome-like sheet metal housing portion 30 is secured to the forward end of support 23, forming a compressed air chamber 31 surrounding burner 16. The burner has a plurality of air inlet passages 32 and is supplied with fuel at its central portion by nozzles 33 in shaft 26, the nozzles receiving fuel from an axial passage 34 in the compressor shaft.

Burner 16 is of generally toroidal shape, having an outlet portion 35 extending inwardly and then axially from the outer portion thereof. Additional air inlet passages 36 are provided in the burner passing through outlet portions 35. A first stage nozzle ring 37 is secured to the forward end of burner 16 by means of an annular flexible diaphragm 38 and an outer row of bolts 39, as well as by an inner row of bolts 41 extending through an inwardly directed flange 42 on ring 37. The exit portion of burner 16 is of thickened configuration for this purpose.

Second stage nozzle and turbine wheel shroud subassembly 18 comprises a second stage nozzle ring 43, rub ring 44 surrounding nozzle ring 43, a first stage turbine shroud 45 and a second stage turbine shroud 46. These elements are integrally secured together, and shroud 45 has a flange 47 which is disposed between a flange 48 on housng portion 29 and a flange 49 on burner 16. Flanges 47, 48 and 49 are secured together by a single row of circumferentially spaced bolts 51. An interstage bearing support 52 is secured to the inner portion of nozzle ring 43, and housing 19 has a cylindrical portion 53 extending forwardly from flange 48 inwardly of bolts 51. Housing portion 53 has a relatively heavy outwardly extending flange 54, used to secure power head subassembly 13 to gear box subassembly 14, as later described.

A relatively light inwardly and rearwardly directed flange 55 is also formed at the forward end of housing portion 53, and supports an exhaust duct subassembly 56. This subassembly is of such configuration as to conduct the exhaust gases leaving second stage turbine wheel 57 in a path which curves from an axial to a radial direction between power head subassembly 13 and gear box subassembly 14. Exhaust duct subassembly 56 is shown as having a portion which partially surrounds housing portion 53, with a tangential exit 58. This exit is shown on FIGURE 1, although actually it will not necessarily be in a vertical plane. A plurality of nested diffuser vanes 59 are mounted within the initial outwardly curved portion of exhaust duct subassembly 56; these vanes may be held in place by spacer bolts 60 secured to the exhaust duct. It will be understood from the following description that the configuration of exhaust duct subassembly 56 may be varied considerably to meet individual space requirements because of the novel securing arrangement between power head subassembly 13 and gear box subassembly 14.

Gear box subassembly 14 comprises a housing 61 having a rearward extension 62 within the entrance portion of exhaust duct subassembly 56, a heat shield 63 being disposed between duct 56 and housing extension 62. A slidable connection 64 is provided between the inner portion of exhaust duct subassembly 56 and the rearward end of housing extension 62.

A bearing support 65 is mounted within extension 62 and carries radial bearings 66 which rotatably support a second stage rotor shaft 67 extending forwardly from second stage turbine wheel 57. A shaft 68 extends forwardly from first stage rotor 17 within shaft 67, and a quill shaft 69 is splined to shaft 68 and extends outwardly of shaft 67. A pair of power pinions 71 are keyed to shaft 67, these pinions being arranged in herringbone fashion.

An intermediate shaft 72 is rotatably mounted in housing 61 and in spaced parallel relation with the central turbine axis. A pair of herringbone gears 73 are keyed to shaft 72 and mesh with power pinions 71. An output shaft carrier 74 in the form of a housing cover is secured to housing 61 and has a rearwardly extending bearing support 75 within the housing. Support 75 carries combined thrust and radial bearings 76, and an output shaft 77 is rotatably supported by these bearings. Shaft 77 has a pair of gears 78 within housing 61 arranged in herringbone fashion, and a pair of gears 79 keyed to intermediate shaft 72 mesh with gears 78. The power train will thus be from pinions 71 through gears 73, shaft 72, gears 79, and gears 78 to output shaft 77.

A first stage accessory shaft 81 is rotatably supported within output shaft 77 and is splined at 82 to the forward end of quill shaft 69. A pair of first stage accessory drive pinions 83 and 84 are keyed to shaft 81 in the vicinity of spline 82. Pinion 83 drives an oil pump and fuel governor idler gear 85 rotatably mounted within housing 61 on the same shaft as a pinion 86. The latter pinion drives a gear 87 on a shaft 88 rotatably mounted within a downward extension 89 of housing 61, this extension having an oil drain elbow 91. Shaft 88 is connected to a lubricating oil pump 92 on the housing of which is mounted a centrifugal type of fuel control governor 93. This governor is of the type which may be set for any predetermined speed and will decrease the flow of fuel to burner 16 upon an increase in speed until the governor returns to its predetermined speed.

Pinions 83 and 84 also mesh with a pair of gears 94 coaxial with intermediate shaft 72 between gears 73 and 79 and secured to the outer element 95 of a one-way overrunning clutch generally indicated at 96. This clutch is of the type having a sprag 97 between its outer element 95 and its inner element 98, the arrangement being such that the inner and outer elements will rotate independently as long as the rotational speed of inner element 98 is less than that of outer element 95, the elements rotating in the same direction. However, if the rotational speed of element 98 is increased to the point where it begins to exceed that of element 95, element 98 will drive element 95 through sprag 97. Inner element 98 of clutch 96 is keyed to shaft 72, so that its rotational speed will be controlled by the speed of output shaft 77. The gear ratios are such that under normal speeds and under normal loads, element 98 will be slower than element 95. However, should the load on output shaft 77 suddenly be decreased, the subsequent increase in speed of intermediate shaft 72 will cause gears 94 to be driven by shaft 72. This in turn will drive gears 83 and 84 at a faster rate, increasing the speed of the fueel governor and causing the fuel supply to be cut back.

Shaft 72 is also provided with a gear 99 which may be used to drive any second stage accessories such as an air compressor or a hydraulic unit. A gear 101 is secured to outer clutch element 95 and may be connected to a starter-generator (not shown). A housing portion shown partially at 102 may be provided for enclosing the upper portions of the gearing.

Figure 2:
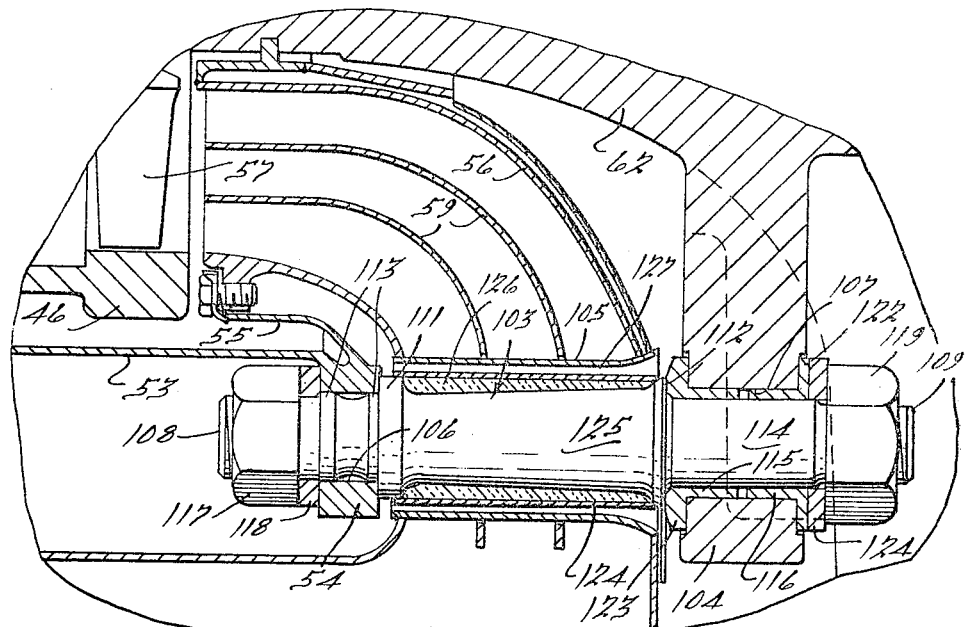
FIGURE 2 is an enlarged detailed cross-sectional view of one of the bolts which secures the power head to the gear housing, and its associated parts.

The means for securing power head subassembly 13 to gear box subassembly 14 comprises a plurality of supporting bolts generally indicated at 103. Four bolts may suitably be used for this purpose, the bolts being spaced 90° apart and 45° from the vertical and horizontal planes passing through the turbine axis. One bolt 103 is indicated in dotted lines in FIGURE 1, and the constructional details of a bolt is shown in FIGURE 2.

Gear box housing 61 has a flange 104 facing flange 54 of housing portion 53, and bolts 103 all extend through these flanges. For this purpose, tubes 105 are provided in apertured portions of exhaust duct subassembly 56 and diffuser blades 59, these tubes being concentric with bolt receiving apertures 106 in flange 54 and apertures 107 in flange 104. Tubes 105 provide openings through which bolts 103 extend, the ends of tubes 105 being in sealing relaion with duct 56.

Each bolt 103 comprises a first threaded end portion 108 rearwardly of flange 54, a second threaded end portion 109 forwardly of flange 104, a first shoulder 111 facing the forward surface of flange 54, and a second shoulder 112 facing the rearward surface of flange 104. A pair of lands 113 are provided between threaded end portion 108 and shoulder 111, lands 113 being disposable within and engageable with aperture 106. A land 114 is provided between threaded portion 109 and shoulder 112, this land being disposable within a pair of bushings 115 and 116 fitting within aperture 107. All apertures 106 and 107 are formed so as to be accurately located with respect to the turbine axis, so that subassemblies 13 and 14 and their associated elements will be properly aligned.

A nut 117 is provided on the threaded portion 108 of each bolt 103, this nut engaging a washer 118 which in turn engages the rear surface of flange 54, drawing shoulder 111 against this flange. A nut 119 is threadably mounted on portion 109 of each bolt, this nut engaging a washer 121 which in turn engages a shoulder 122 on bushing 116, the bushing engaging a counterbored portion of the forward surface of flange 104.

Each bushing 115 has a shoulder 123 disposed between the rear surface of flange 104 and shoulder 112. The arrangement is therefore such that tightening of nuts 117 and 119 on each bolt will cause the bolts to secure power head assembly 13 to flange 104 in cantilever fashion. Bolts 103 are made of sufficient size and strength to support subassembly 13 in this manner. Subassembly 14 will of course be secured to a stationary support (not shown).

A heat shield 124 is mounted on each bolt 103, extending between shoulder 111 and shoulder 112. The central portion 125 of bolt 103 is recessed to form a space between shield 124 and the bolt, and this space is preferably filled with heat-insulative material 126. The internal diameter of each tube 105 is greater than the external diameter of heat shield 124, thus providing an air space 127 between each bolt and exhaust duct subassembly 56, the air spaces being connected to atmosphere.

It should be noted that the power head mounting construction described above, involving the use of a few accurately located bolts, simplifies and improves the maintenance of alignment between the subassemblies and will permit substantial variations in the configuration of exhaust duct subassembly 56.

Inlet vane subassembly 12 is best seen in FIGURES 3 to 5 and is mounted on the outwardly facing surface of compressor diffuser cover 21 by means of bolts 128. The subassembly comprises a supporting casting generally indicated at 129 which has a flange 131 secured to cover 21, a flared inlet portion 132, and an intermediate portion 134 connecting flared portion 132 with the central aperture in flange 131 which leads to compressor 15. A cylindrical outer member 135 may be mounted on the entrance of portion 132 if desired. A plurality of streamlined stationary webs 136 extend radially inwardly from portion 132 and support a centrally located streamlined hub 137. An inner vane supporting member 138 is secured by bolts 139 to the end of hub 137 facing compressor shaft 26. A fuel supply conduit 141 extends through web 136 and is connected to an axial passage 142 in hub 137, a connecting member 143 extending through a central aperture 144 in member 138 and into fuel passage 34 of shaft 26.

A plurality of radially disposed angularly adjustable inlet vanes 145 are disposed between member 138 and intermediate portion 134 of casting 129. Vanes 145 are of streamlined shape, and each blade is fixed to a rod 146 extending longitudinally through the blade adjacent the leading edge thereof, as seen in FIGURE 4. The inner portions 147 of rods 146 are rotatably mounted within apertures 148 formed in the facing surfaces of hub 137 and member 138, the mounting being such that rods 146 may rotate on their longitudinal axes. Sleeves 149 are mounted on the outer ends 151 of rods 146 outwardly of casting 149, and the inner ends of these sleeves are pivotally mounted in bearings 152 carried by the casting.

An adjusting ring 153 is rotatably mounted on casting portion 134 between rod portions 151 and flange 131. Ring 153 may be fabricated of two semi-circular portions connected by mating flanges 154 and 155, as seen in FIGURE 3. The ring carries a plurality of circumferentially spaced rollers 156 disposed within a recessed track 157 in casting 129 and supported by pins 158 carrying roller bearings 159.

A crank arm 161 is secured to the outer end of each rod portion 151, as seen in FIGURE 4, these arms extending toward ring 153. A link 162 connects the outer end of each crank arm 161 with ring 153, all links 162 extending in the same direction as seen in FIGURE 3. The connections 163 between links 162 and ring 153, as well as the connections 164 between links 162 and crank arms 161, are preferably of a ball joint type permitting universal motion. Links 162 are of adjustable length, being held in their adjusted position by lock nuts 165.

Means are provided for locking ring 153 in its adjusted position, as shown in FIGURE 5. This means comprises a circumferentially split portion of the ring within which is disposed a wedge member 166, the ring having adjacent surfaces 167 and 168 which are complementary to the wedge and are inclined toward each other in a radially outward direction. A bolt 169 is threaded into wedge 166, the head of the bolt being disposed within a counterbore 171 of a block 172 mounted on ring 153. Tightening of bolt 169 will thus draw wedge 166 radially outwardly spreading the adjacent portions of ring 153 against the side walls of recess 157 to frictionally lock the ring in its adjusted position.

It will thus be seen that the inclinations of vanes 145 may be simultaneously adjusted by rotation of ring 153 to obtain the optimum inlet flow conditions for centrifugal compressor 15 to suit particular requirements. All vanes 145 will shift to the same angle for any given movement of the ring, and will all have the same angular relationship to the inlet passage at any one time.

In operation, air will be drawn past inlet vanes 145 into centrifugal compressor 15, the compressed air passing through diffuser passages 24 into chamber 31 surrounding burner 16. Fuel will flow through passages 141, 142 and 143 into passage 34 within compressor shaft 26, and out through fuel nozzles 33 into burner 16. The combustion gases will flow through outlet 35 of burner 16 and first stage nozzles 37 to first stage turbine wheel 17. The gases will then flow through second stage nozzles 43 and second stage turbine wheel 57 to exhaust duct subassembly 56, passing diffuser plates 59 to exit 58 of the exhaust duct.

Turbine wheel 17 will rotate compressor shaft 26, thus driving the compressor. Turbine wheel 17 will also rotate shaft 68 which is splined to quill shaft 69, the latter being in turn splined to first stage accessory shaft 81. This will cause rotation of first stage accessory pinions 83 and 84, pinion 83 driving lubricating oil pump 92 and fuel governor 98 through gears 85, 86 and 87. Gears 83 and 84 will also drive gears 94 mounted on intermediate shaft 72 through overrunning clutch 96.

Second stage turbine wheel 57 will drive power pinons 71 through shaft 67. These pinions will rotate gears 73 fixed to shaft 72, thus driving gears 79 which rotate gears 78 on output shaft 77. Bearings 76 will act as thrust bearings for output shaft 77, and because of the herringbone nature of the gears connecting shaft 77 with shaft 67, the latter will be held against axial shifting movement even though it is not provided directly with thrust bearings.

Rotation of intermediate shaft 72 will also cause rotation of inner element 98 of overrunning clutch 96. Normally, this rotation will be slower than that of outer element 95. However, should shaft 72 suddenly speed up, for example upon a decrease or removal of the load applied to the output shaft, inner element 98 of clutch 96 will drive outer element 95, thus causing gears 94 to drive pinions 83 and 84. This in turn will cause faster rotation of gears 85, 86 and 87, increasing the speed of fuel governor 93 so that the latter will decrease the rate of fuel flow, thus preventing excessive first stage speeds.

Should it be desired to change the adjustment of inlet vanes 145, clamping screw 169 will be rotated to loosen clamping wedge 166. Ring 153 may then be manually rotated, causing links 162 to rotate rods 146 through crank arms 161. Since vanes 145 are fixed to rods 146, rotation of the latter will cause simultaneous angular adjustment of vanes 145. When the desired setting has been achieved, screw 169 may again be tightened, locking ring 153 in its newly adjusted position.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a gas turbine, a power head having a housing, a compressor, burner, first stage nozzle vanes, first stage turbine wheel, and second stage nozzle vanes axially arranged in the order related, duct means connecting said compressor and burner, means conducting gases from said burner to said first stage nozzle vanes, from said first stage nozzle vanes to said first stage turbine wheel, and from said first stage turbine wheel to second stage nozzle vanes, a gear box housing having gearing and a second stage turbine wheel axially alined with and adjacent said second stage nozzle vanes, shaft means connecting said second stage turbine wheels and said gearing, an exhaust duct disposed between said power head and gear box and extending radially outwardly, a plurality of circumferentially spaced tubes extending axially through said exhaust duct and open to atmosphere, and supporting means for said power head comprising a plurality of elongated fasteners extending through and spaced radially from said tubes to provide a cooling space therebetween, one end of each fastener being secured to said gear box housing and the other end to said power head housing.

2. The combination according to claim 1, each of said elongated fasteners comprising a bolt threaded at both ends and having two outwardly facing shoulders, apertured flanges on said gear box housing and power head housing engageable by said shoulders, and nuts threadably mounted on said bolts to draw said flanges toward said shoulders.

3. The combination according to claim 2, each of said bolts further having a recessed portion between said shoulders, a heat shield extending between said shoulders and surrounding said recessed portion, and heat insulative material within said recessed portion between said bolt and said heat shield.

4. In a gas turbine, a power head having a housing, a centrifugal compressor at one end of said housing, a burner within said housing, duct means connecting said compressor and burner, a first stage turbine wheel within said housing connected to said compressor, second stage nozzle vanes within said housing adjacent said first stage turbine wheel, an exhaust duct at the forward end of said housing and extending radially outwardly, an inwardly directed flange at the forward end of said housing supporting said exhaust duct, a gear box having a housing, gearing within said gear box housing, a second stage turbine wheel rotatably supported within said gear box housing adjacent said second stage nozzle vanes, shafts connecting said first and second stage turbine wheels to said gearing, outwardly directed flanges on said power head housing and said gear box housing disposed on opposite sides of said exhaust duct, circumferentally spaced clearance tubes extending axially through said exhaust duct between said flanges, and a plurality of elongated fasteners disposed within and spaced radially inwardly from said clearance tubes to provide a cooling space therebetween the ends of said fasteners being secured to said flanges.

5. The combination according to claim 4, said burner being in the form of an annular combustion chamber having a circular flange, said power head housing having a wider portion and a narrower portion in axial alignment, a circular flange connecting said housing portions, a subassembly comprising a second stage nozzle vane ring encircling said second stage nozzle vanes and first and second stage turbine wheel shrouds, said ring and shrouds being secured together to form a unitary subassembly, a circular flange on said subassembly, and threaded fasteners securing together said burner, subassembly and power head housing circular flanges.

References Cited by the Examiner
UNITED STATES PATENTS

| | | | |
|---|---|---|---|
| 1,551,958 | 9/1925 | Kennedy | 74—665 |
| 2,186,522 | 1/1940 | Ditges | 74—665 |
| 2,738,647 | 3/1956 | Hill | 60—39.31 X |
| 2,795,928 | 6/1957 | Huebner | 60—39.16 |
| 2,922,278 | 1/1960 | Szydlowski | 60—39.31 X |
| 2,933,235 | 4/1960 | Neumann | 230—114 |
| 2,960,306 | 11/1960 | Collman. | |
| 2,968,922 | 1/1961 | Gilbert | 60—39.31 X |
| 3,032,985 | 5/1962 | Alexander | 60—39.16 |
| 3,056,541 | 10/1962 | Foweraker | 230—114 |
| 3,077,074 | 2/1963 | Collman | 60—39.15 X |
| 3,088,278 | 5/1963 | Franz | 60—39.16 |
| 3,100,378 | 8/1963 | Austin | 60—39.16 |
| 3,116,605 | 1/1964 | Amann et al. | 60—39.16 X |
| 3,152,443 | 10/1964 | Newland | 60—39.16 |

FOREIGN PATENTS

| | | |
|---|---|---|
| 962,057 | 6/1964 | Great Britain. |

JULIUS E. WEST, *Primary Examiner.*

MARK NEWMAN, *Examiner.*